United States Patent
Tomioka

(10) Patent No.: US 7,800,361 B2
(45) Date of Patent: Sep. 21, 2010

(54) MAGNETIC ENCODER

(75) Inventor: Masanori Tomioka, Okayama (JP)

(73) Assignee: Uchiyama Manufacturing Corp., Enami, Okayama-shi, Okayama (JP)

( * ) Notice: Subject to any disclaimer, the term of this patent is extended or adjusted under 35 U.S.C. 154(b) by 0 days.

(21) Appl. No.: 12/219,248

(22) Filed: Jul. 18, 2008

(65) Prior Publication Data
US 2009/0058403 A1    Mar. 5, 2009

(30) Foreign Application Priority Data
Jul. 18, 2007    (JP)    ............... 2007-186434

(51) Int. Cl.
*G01B 7/30* (2006.01)
(52) U.S. Cl. ............... 324/207.25; 324/174
(58) Field of Classification Search ............ 324/174, 324/207.25; 73/514.31, 514.39
See application file for complete search history.

(56) References Cited

U.S. PATENT DOCUMENTS 7,592,798 B2 * 9/2009 Yabe et al. ............ 324/174

2007/0152657 A1 * 7/2007 Yabe et al. ............ 324/174
2008/0218161 A1 * 9/2008 Ishii et al. ............ 324/207.25

FOREIGN PATENT DOCUMENTS

JP    2004-138597    5/2004
JP    2005-233321    9/2005

OTHER PUBLICATIONS

Morimoto et al., Rotor for Motor Includes Magnet Which Is Bonded to Shaft by Adhesive Layer Having Thickness Ranging from 20 Micrometer to 120 Micrometer, Sep. 19, 2003, Derwent-ACC-No. 2003-686011.*

* cited by examiner

*Primary Examiner*—Bot L LeDynh
(74) *Attorney, Agent, or Firm*—Bacon & Thomas, PLLC

(57) ABSTRACT

A magnetic encoder constituting rotation detector in combination with a magnetic sensor, comprising a circular multipolar magnet and a metal reinforcing ring to which the circular multipolar magnet is fixed is disclosed.

The encoder is characterized by a projecting portion which is provided at a surface of the circular multipolar magnet facing to the metal reinforcing ring, so as to form an adhesive space to secure uniform adhesive layer between metal reinforcing ring and the circular multipolar magnet, thereby preventing from being peeled off or cracked. And the height of the projecting portion is adapted to define the thickness of the adhesive layer.

4 Claims, 15 Drawing Sheets

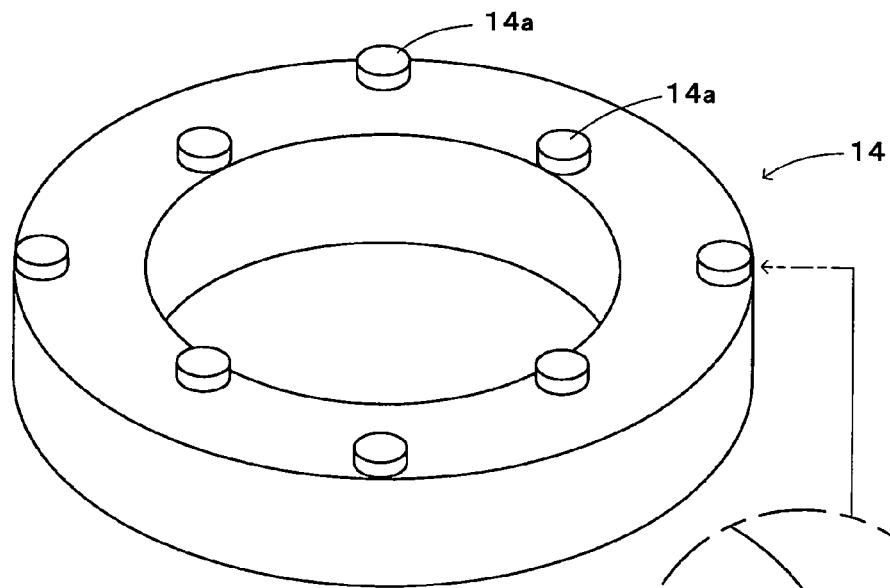
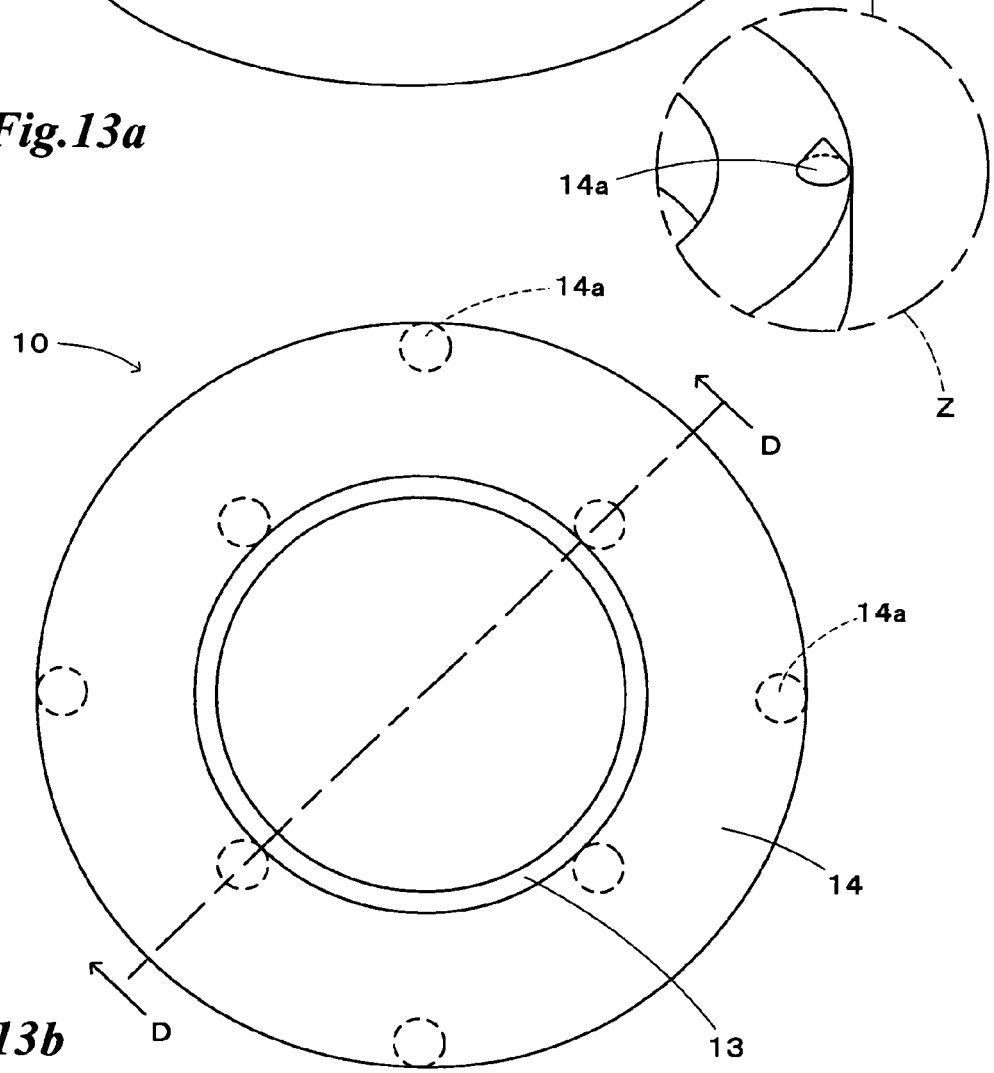
*Fig.13a*
*Fig.13b*

MAGNETIC ENCODER

BACKGROUND OF THE INVENTION

1. Field of the Invention

The present invention relates to a magnetic encoder constituting a rotation detection apparatus for detecting the rotation number of the wheel for automobiles and more particularly relates to a magnetic encoder provided to detect the rotation number of the wheel in order to be applied to an antilock brake system or a traction control system of automobiles.

2. Prior Art

A magnetic encoder comprised of a metal reinforcing ring fitted and fixed to a rotary side member of the wheel for automobile and a circular multipolar magnet fixed to the metal reinforcing ring provided so as to face the magnetic sensor at the vehicle body side is applied. The circular multipolar magnet is formed into a magnetic encoder such that a magnetic powder such as ferrite is mixed and contained in rubber or a resin material, the mixture is molded separately from the metal reinforcing ring, the molded product is fixed and integrated with the metal reinforcing ring with an adhesive, and the product is magnetized by providing a plurality of N poles and S poles alternately.

Thus formed magnetic encoder is apt to be exposed in a hard environment where the foreign materials such as water, mud, dust and the like are scattered when it is used for detecting the rotation of the automobile wheels, so that a high durability is required. A thermal shock test is executed by alternately repeating high temperature conditions and low temperature conditions in order to examine the durability as a product. The circular multipolar magnet may be cracked or distortion or gap may be caused between the metal reinforcing ring and the circular multipolar magnet by the difference of the linear expansion rate of the metal reinforcing ring and the circular multipolar magnet.

In order to solve such problems, it can think up to obtain a thickness of the adhesive layer to fix the metal reinforcing ring and the circular multipolar magnet in order to absorb the thermal expansion difference therebetween.

The following patent document 1 discloses a magnetic encoder in which a reinforcing ring (metal reinforcing ring) and a magnetic ring are fixed with an adhesive and thereafter they are magnetized by providing S poles and N poles alternately along the circumference. The following patent document 2 discloses that a groove is formed on the adhesion face of an encoder (circular multipolar magnet) to a fitting member (metal reinforcing ring) fixed to a rotary body, said encoder being formed of a magnet which is circular and is magnetized in multipolar along the circumferential direction.

[Patent document 1] JP-2004-138597-A

[Patent document 2] JP-2005-233321-A

SUMMARY OF THE INVENTION

Problems to be Solved in the Invention

In the above-mentioned patent documents 1 and 2, the metal reinforcing ring and the magnetic ring or the circular multipolar magnet are attached with adhesive, however they do not propose to get the thickness of an adhesive layer to absorb the thermal expansion difference.

In order to obtain the layer thickness of the adhesive applied between the metal reinforcing ring and the circular multipolar magnet, an adhesive layer with enough thickness to absorb the thermal expansion difference cannot be formed only by attaching the metal reinforcing ring and the circular multipolar magnet with the adhesive, even if the adhesive is overlapped, because the adhesive is in a liquid condition. Further, although the adhesive is required to be applied with a uniform thickness for stable adhesion, it is difficult to have a uniform layer thickness.

The present invention is proposed in order to solve the above-mentioned problems and its object is to provide a highly durable and reliable magnetic encoder in which the metal reinforcing ring and the circular multipolar magnet are not peeled off by the thermal expansion difference thereof and are firmly united.

Means to Solve the Problems

According to the first aspect the present invention, a magnetic encoder constitutes a rotation detector in combination with a magnetic sensor fixed onto a stationary side member and comprises a metal reinforcing ring fitted into a rotary side member and a circular multipolar magnet fixed to the metal reinforcing ring with an adhesive. The circular multipolar magnet has a projecting portion on its surface facing to the metal reinforcing ring to configure an adhesive space to secure an adhesive layer between the metal reinforcing ring and the circular multipolar magnet, the circular multipolar magnet is fixed to the reinforcing ring with the adhesive layer, the thickness of the adhesive layer being defined by the height of the projecting portion.

According to the second aspect of the present invention, the projecting portion is configured as a ring wall edge along the circumference of the circular multipolar magnet. According to the third aspect of the present invention, the projecting portion is partially configured along the circumference of the circular multipolar magnet.

Further, according to the fourth aspect of the present invention, the projecting portion is configured in a radial direction from the center of the circular multipolar magnet. Still further according to the second aspect of the present invention, a plurality of the projecting portions are configured at separate places.

In addition, according to the sixth aspect of the present invention, the projecting portion has a rib edge with a tapered off end in cross section. Further according to the seventh aspect of the present invention, the thickness of the adhesive layer is from 20 μm to 300 μm in at least one part.

Effect of the Invention

According to the first aspect of the present invention, the projecting portion is configured so as to secure an adhesive space between a circular multipolar magnet to be fixed to the metal reinforcing ring, so that a uniform thickness of adhesive layer is mechanically ensured, thereby facilitating the production and achieving a stable quality. Namely, the configuration of the circular multipolar magnet is determined by a mold, so that a mold with a depressed portion defined by the projecting portion can be easily manufactured by using such an original mold with a desired configuration for forming the circular multipolar magnet.

Further, an adhesive layer with an uniform thickness can be easily formed between their boundary surfaces when attaching thus formed magnetic ring with the metal reinforcing ring.

The adhesive layer is secured constant by the projecting portion in its thickness between the metal reinforcing ring and the circular multipolar magnet, so that the thermal shock test can be cleared, the adhesive layer can also absorb the thermal expansion difference due to the difference of the material between a metal reinforcing ring and the circular multipolar magnet under such environment that the temperature is remarkably changed, and the circular multipolar magnet can prevent in advance from being peeled off or cracked.

According to the second to the fifth aspects of the present invention, a constant thickness adhesive layer can be easily obtained by providing the projecting portion and the above-mentioned effect can be achieved. The adhesion face to the metal reinforcing ring can be quickly recognized because the projecting portion is formed on the adhesion face of the circular multipolar magnet, thereby enabling to manufacture the magnetic encoder smoothly.

According to the third and the fifth aspects of the present invention, the projecting portion is provided partially or at plural portions, so that the area of the projecting portion contacting with the metal reinforcing ring can be smaller and the adhesion surface area of the layer can become wide. Therefore, the metal reinforcing ring and the circular multipolar magnet can be stably and firmly bonded by the multiplication of the above effects.

According to the sixth aspect of the present invention, the sectional shape of the tip portion of the projecting portion is tapered, so that the area of the projecting portion to contact with the metal reinforcing ring can be smaller and the adhesion surface area of the layer can become wide. Therefore, in addition to the above-mentioned effects, the metal reinforcing ring and the circular multipolar magnet can be stably and firmly bonded.

According to the seventh aspect of the present invention, the thickness of at least a part of the adhesive layer is from 20 μm to 300 μm, so that the above-mentioned effects can be achieved. If the thickness is less than 20 μm, the thickness is not adequately ensured and the thermal expansion difference caused between the metal reinforcing ring and the circular multipolar magnet is not absorbed by the adhesive layer, and the circular multipolar magnet is not apt to be prevented in advance from being peeled off or cracked. If the thickness is over 300 μm, the magnetic flux density of the circular multipolar magnet which is magnetized in multipolar is reduced and the characteristic is deteriorated.

BRIEF DESCRIPTION OF THE DRAWINGS

FIG. 10b is a fragmental sectional view along the line A-A in FIG. 10a, and FIG. 10c is a fragmental sectional view along the line B-B in FIG. 10a.

FIG. 13a is a perspective view showing a circular multipolar magnet constituting a magnetic encoder according to a still further embodiment, and FIG. 13b shows the plane view of the magnetic encoder.

DETAILED DESCRIPTION OF THE INVENTION

Now, a preferred embodiment of the present invention is explained referring to the attached drawings. In the following description, a circular multipolar magnet 14 is a magnetized product and the magnetic ring is a product before magnetizing.

Figure 1:
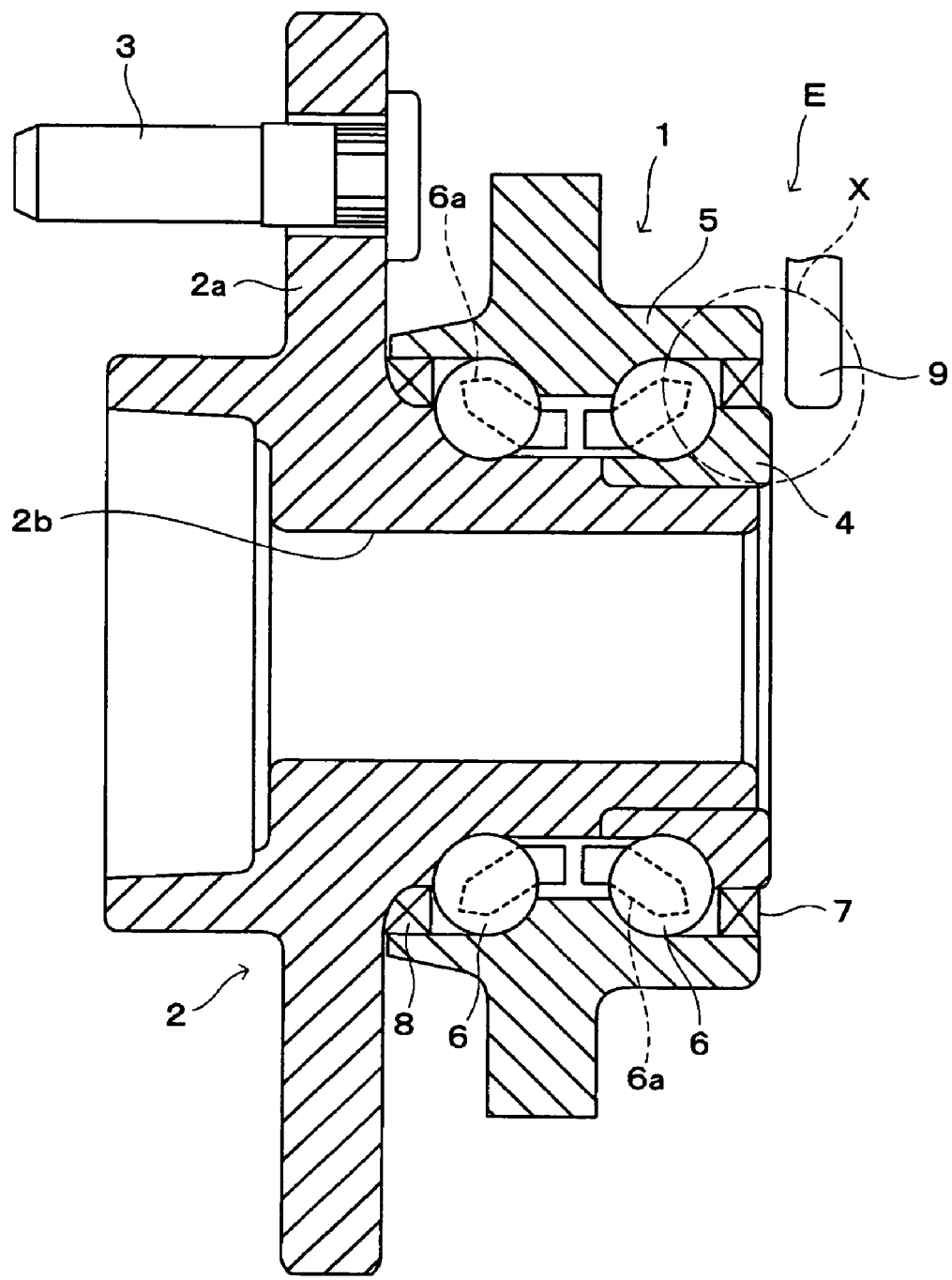
FIG. 1 is a vertical sectional view showing one example of a bearing structure assembled with the magnetic encoder of the present invention.
Figure 2:
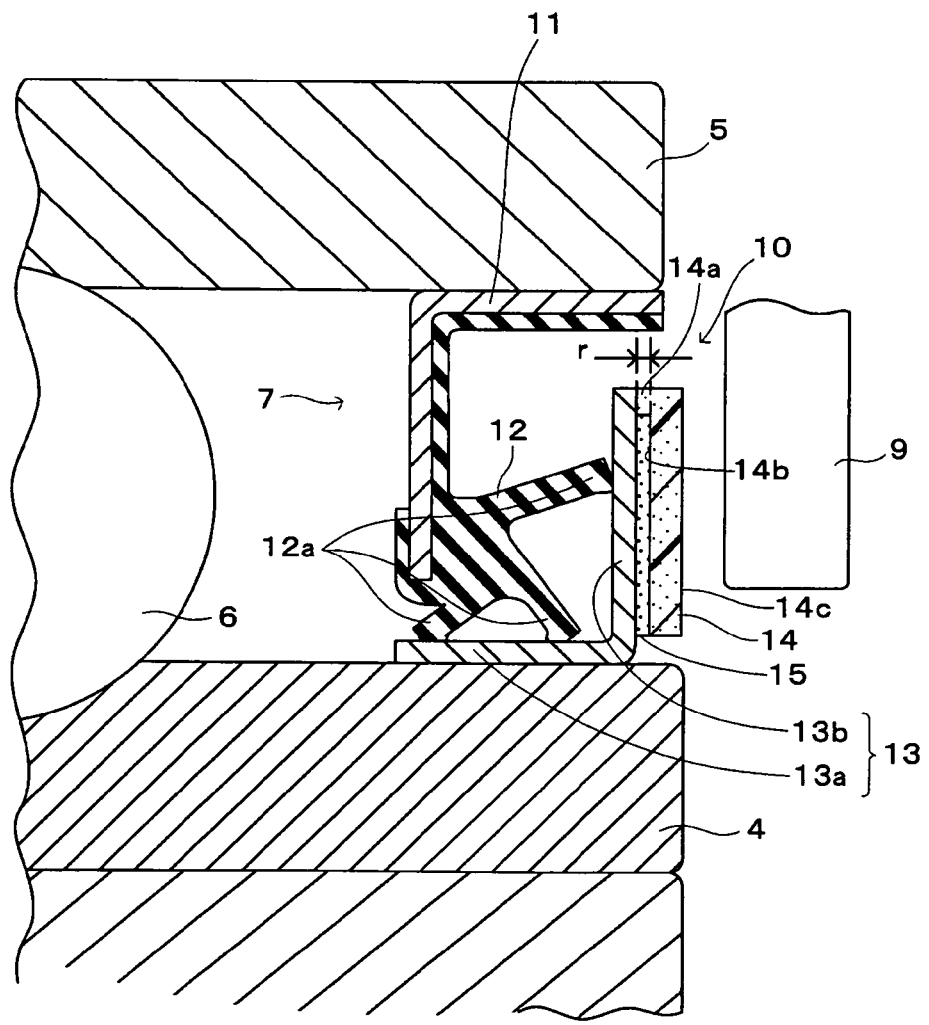
FIG. 2 is an enlarged view of the area "X" in FIG. 1.
Figure 3:
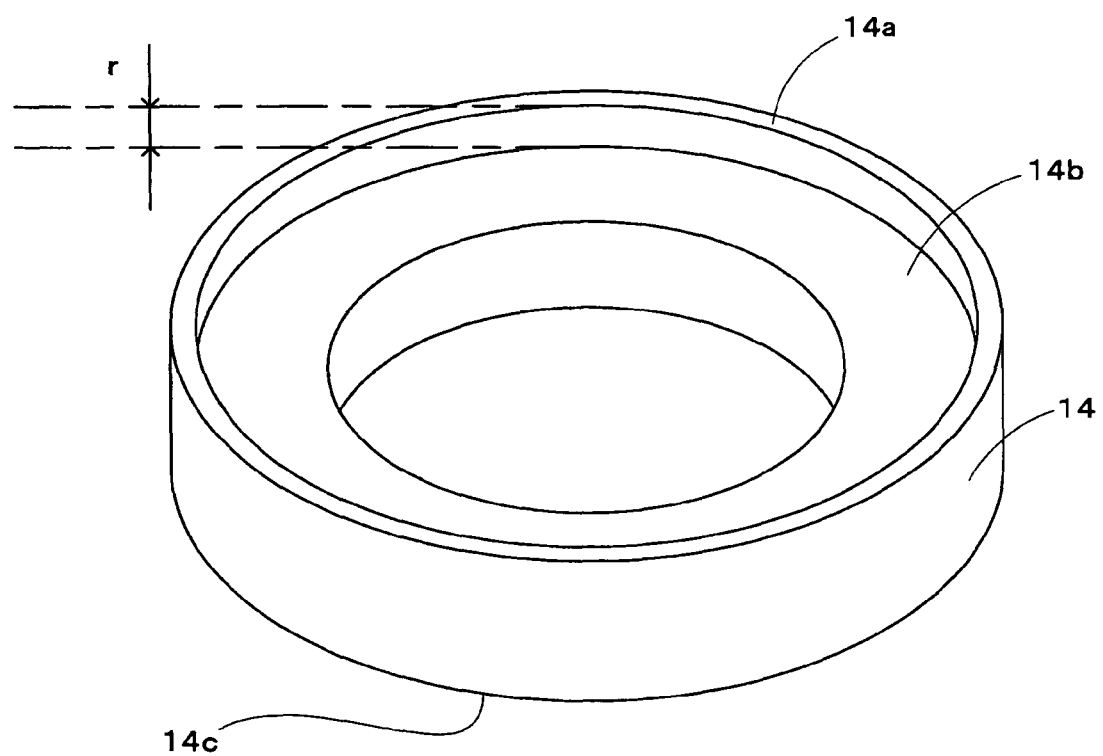
FIG. 3 is a perspective view showing a circular multipolar magnet constituting the magnetic encoder.

The first embodiment of the present invention is explained referring to FIG. 1 to FIG. 3.

FIG. 1 shows one example of the structure of supporting the automobile wheel with a rolling bearing unit 1 in which a tire wheel (not shown) is fixed to the hub flange 2a of the hub 2 constituting the inner wheel (rotary side member) with a bolt 3. A driving shaft (not shown) is spline fitted in a spline axial hole 2b formed on the hub 2 and the rotary driving force of the driving shaft is transmitted to the tire wheel. The hub 2 constitutes the inner wheel together with an inner wheel member 4. The outer wheel (stationary side member) 5 is attached and fixed to the vehicle suspension (not shown) of the automobile body. Two rows of rolling elements (ball) 6 . . . are interposed between the outer wheel 5 and the inner wheel (hub 2 and inner wheel member 4) while being held with a retainer 6a. Outside of the orbit of the two rows of rolling elements (ball) 6 . . . in the axial direction, seal rings 7, 8 are internally press fitted between the outer wheel 5 and the inner wheel (hub 2 and inner wheel member 4) in order to prevent leakage of lubricant (such as grease) filled in a rolling portion of the rolling elements 6 . . . or to prevent entering of muddy water from outside. A magnetic sensor 9 is provided for the outer wheel 5 or a vehicle body (stationary side member) so as to face the outer face of the seal ring 7 at the vehicle body side and is designed to detect the rotation number of the tire wheel together with a magnetic encoder 10 mentioned later.

FIG. 2 shows an enlarged sectional view (enlarged view of "X" in FIG. 1) of the mounting portion of the seal ring 7 at the vehicle body side. The seal ring 7 comprises the magnetic encoder 10 to be integrally fitted in the outer circumference (external peripheral face) of the inner wheel member 4, a core member 11 to be internally press fitted into the inner circumference (inner peripheral face) of the outer wheel 5 and an elastic seal lip member 12, thereby constituting a pack seal type seal ring (referred to pack seal hereinafter). The elastic seal lip member 12 has a plurality of lips 12a . . . made of an elastic material such as rubber, of which tips elastically and slidably contact with the inner face (at rolling element 6 side) of the metal reinforcing ring (slinger) 13 constituting the magnetic encoder 10 and is fixed to the core member 11.

The core member 11 and the metal reinforcing ring 13 are formed by processing a cold rolled steel sheet such as SOCC in the form shown in the figure and the elastic seal lip member 12 is made of rubber selected from NBR, H-NBR, ACM, AEM, FKM and the like.

The magnetic encoder 10 comprises the metal reinforcing ring (slinger) 13 having a cylindrical portion 13a to be fitted and fixed in the external peripheral face of the inner wheel member 4 and an outward brim portion 13b integrally formed at an edge thereof. The magnetic encoder 10 also comprises a circular multipolar magnet 14 which is fixed and integrated to the outer face (at vehicle body side) of the outward brim portion 13b via an adhesive layer 15 mentioned later. The circular multipolar magnet 14 has an adhesion face 14b and a magnetizing face 14c as shown in the figure. A binder containing a magnetic powder is molded in a circular shape, the molded product is fixed and integrated to the metal reinforcing ring 13, then is magnetized by providing a plurality of N poles and S poles along the circumferential direction of the magnetizing face 14c. The magnetic sensor 9 detects the magnetic change of the magnetized portion by the rotation of the magnetic encoder 10 accompanied with the rotation of the hub 2 and the inner wheel member 4, thereby executing rotation detection (rotation number, rotation direction, and the like.

The circular multipolar magnet 14 may be made of a hard rubber magnet which is highly filled comparing with the prior rubber magnet, a plastic magnet, a sintered magnet and the like. The material of the rubber magnet includes NBR, H-HBR, acrylic rubber, fluororubber and the like, the resin material of the plastic magnet may include a thermoplastic resin such as nylon 6, nylon 12, nylon 66, polyphenylene sulfide (PPS) and the like, and the magnetic powder includes a ferrite powder, a rare earth powder (NdFeB, SmFeN) and the like).

A projecting portion 14a for assuring the thickness "r" of the adhesive is formed at the contacting face 14b of the circular multipolar magnet 14 (see FIG. 3) and an adhesive layer 15 keeping a uniform and constant thickness is formed between the metal reinforcing ring 13 and the circular multipolar magnet 14 by the projecting portion 14a. The adhesive may include an elastic adhesive such as an epoxy adhesive, sealant and an elastomeric adhesive.

The projecting portion 14a is formed like a wall along the outer circumferential direction of the circular multipolar magnet 14 and the reference numeral "r" in the figure shows the thickness of the layer. The projecting height of the projecting portion 14a is formed so as to agree with the thickness "r" of the adhesive layer 15 in such a manner at least a part of the thickness "r" of the adhesive layer 15 becomes 20 μm to 300 μm.

When the thickness "r" of the adhesive layer 15 is less than 20 μm, the thickness is not adequately ensured and the thermal expansion difference caused between the metal reinforcing ring 13 and the circular multipolar magnet 14 is not absorbed by the adhesive layer 15, and the circular multipolar magnet 14 is not apt to be prevented in advance from being peeled off or cracked. If the thickness "r" is over 300 μm, the density of the magnetic flux of the circular multipolar magnet 14 which is magnetized in multipolar is reduced and the characteristic is deteriorated.

Therefore, an ideal thickness "r" is preferably 50 μm to 200 μm.

Here, the configuration of the circular multipolar magnet 14 is determined by the mold for molding thereof, so that the original shape (magnetic ring) for the circular multipolar magnet with a desired configuration having the projecting portion 14a can be easily manufactured by forming the mold to have a concave portion for the projecting portion. Accordingly, when the magnetic ring and the metal reinforcing ring 13 are attached with adhesive, the adhesive layer 15 with a constant thickness "r", namely the thickness "r" based on the height of the projecting portion 14a, is formed.

The projecting portion 14a is formed on the contacting face 14b of the circular multipolar magnet 14 (magnetic ring), so that a predetermined thickness "r" can be mechanically ensured, the production can be facilitated and the stable quality can be achieved.

The metal reinforcing ring 13 and/or the circular multipolar magnet 14 may be applied with the adhesive in advance and bonded with the magnetic ring, or the adhesive may be charged into the space (gap), formed by the projecting portion 14a, between the magnetic ring and the metal reinforcing ring 13.

The projecting portion 14a shown in FIG. 2 and FIG. 3 is formed on the entire outer circumferential direction of the circular multipolar magnet 14, however, it may be partially formed (not shown). In such a case, the area of the projecting portion 14a contacting with the metal reinforcing ring 13 is made smaller comparing with the case the projecting portion 14a is formed on the entire circumference, so that the contacting surface area of the layer thickness "r" can be wide and the metal reinforcing ring 13 and the circular multipolar magnet 14 can be stably and firmly bonded.

As mentioned above, the adhesive layer 15 keeping a fixed thickness is formed by the projecting portion 14a between the metal reinforcing ring 13 and the circular multipolar magnet 14, so that the thermal shock test can be cleared and the thermal expansion difference caused between the metal reinforcing ring 13 and the circular multipolar magnet 14 can be absorbed by the adhesive layer 15, and the peel-off and crack of the circular multipolar magnet 14 can be prevented from occurring.

When the metal reinforcing ring 13 and the circular multipolar magnet 14 are fixed and integrated by applying the adhesive on the metal reinforcing ring 13, the adhesive may be applied so as to have protrusion of the adhesive at the edge of the fixed and integrated portion (not shown). By providing such protrusion of the adhesive, water does not enter into the adhesion face more effectively, thereby preventing breakage of the plastic magnet 14 when the entered water gets frozen. When the adhesion faces of the metal reinforcing ring 13 and the circular multipolar magnet 14 to be applied with the adhesive 15 are made coarse, the adhesion and fixing force by the adhesive can be increased.

In this embodiment the magnetic encoder 10 is constituted as one member of the pack seal 7, however, the magnetic encoder 10 may be fitted in the rotary side member as a single element and the magnetic sensor 9 may be provided so as to face the magnetic encoder 10. FIG. 1 and FIG. 2 illustrate the bearing unit 1 for a driving wheel as an example in which the inner wheel is rotated, however, it goes without saying that the present invention can be applied to the bearing unit for a driven wheel in which the outer wheel is rotated. In this case, the magnetic encoder 10 is fitted and fixed to the outer wheel as a rotary side member.

Next, the modified example of the first embodiment is explained referring to FIG. 4a, FIG. 4b through FIG. 9. The common members with the first embodiment are allotted with the same reference numerals and their explanations are omitted here.

Figure 4A:
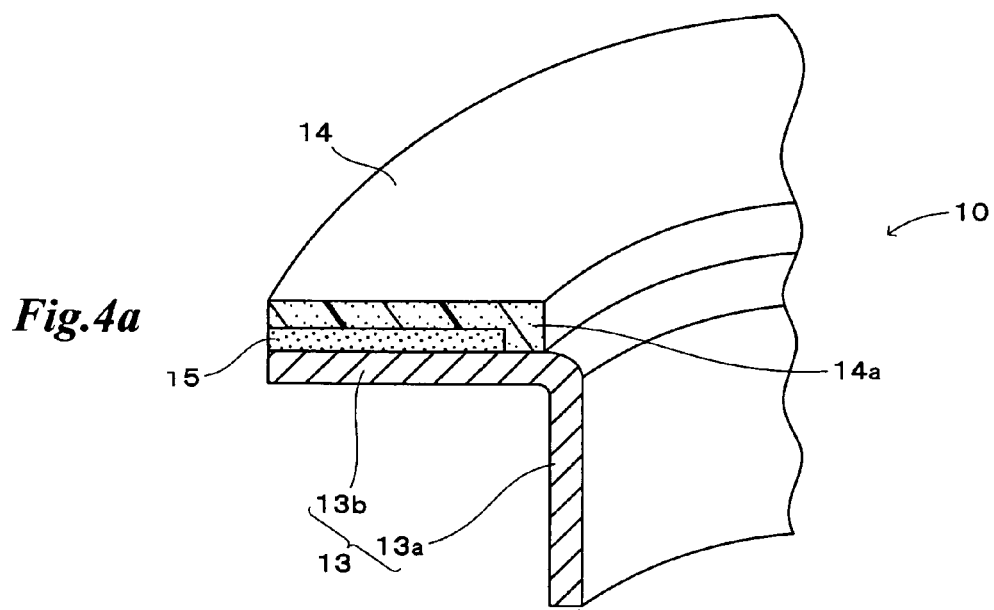
FIG. 4a and FIG. 4b are perspective sectional views of a modified example of the magnetic encoder.

According to the magnetic encoder 10 in FIG. 4a, the projecting portion 14a is formed like a wall on the entire circumference along the inner circumferential direction of the circular multipolar magnet 14. Thus the projecting portion 14a may not be limited to be provided along the outer circumferential direction, but may be provided along the inner circumferential direction.

According to the magnetic encoder 10 in FIG. 14b, the projecting portion 14a is formed like a wall along the inner circumferential direction of the circular multipolar magnet 14 and is provided partially. When the projecting portion 14a is partially provided, the area where the projecting portion 14a contacts the metal reinforcing ring 13 is made smaller comparing with when it is provided on the entire circumference, so that the adhesion surface area of the layer thickness "r" can be wide, thereby stably and firmly bonding the metal reinforcing ring 13 and the circular multipolar magnet 14.

Figure 5A:
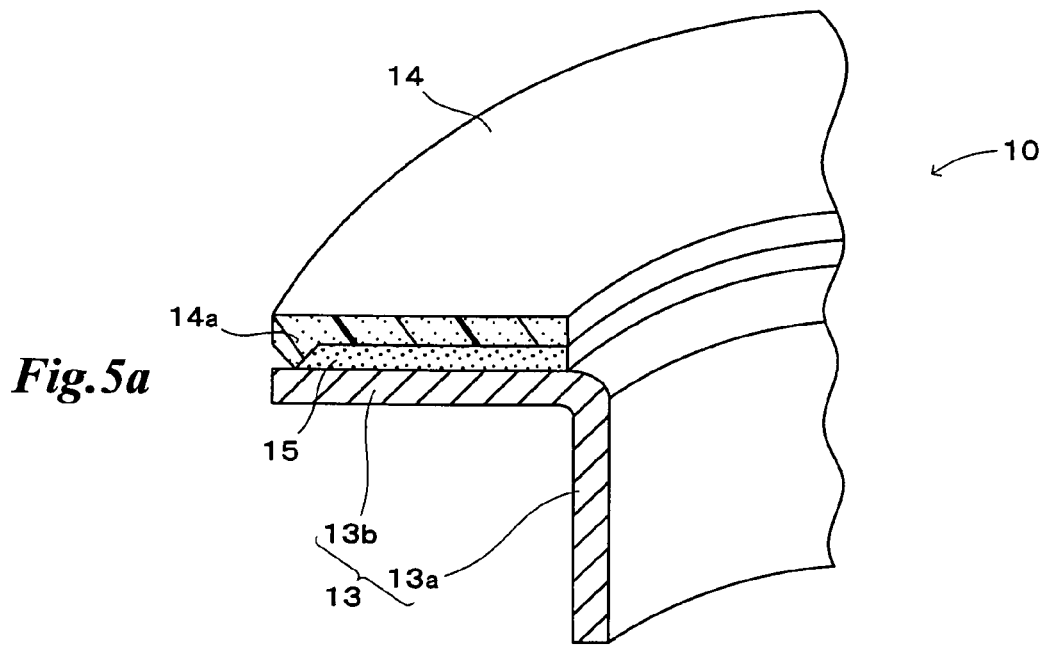
FIG. 5a and FIG. 5b are perspective sectional views of a modified example of the magnetic encoder.

According to the magnetic encoder 10 in FIG. 5a, the projecting portion 14a is formed like a wall along the outer circumferential direction of the circular multipolar magnet 14 and the sectional shape of the tip of the projecting portion 14a is tapered. When the tip of the projecting portion 14a is tapered, the area of the circular multipolar magnet 14 contacting with the metal reinforcing ring 13 is made smaller, thereby increasing the contacting surface area of the layer thickness "r". Accordingly, in addition to the above-mentioned effect, the metal reinforcing ring 13 and the circular multipolar magnet 14 are more stably and firmly bonded.

Figure 5B:
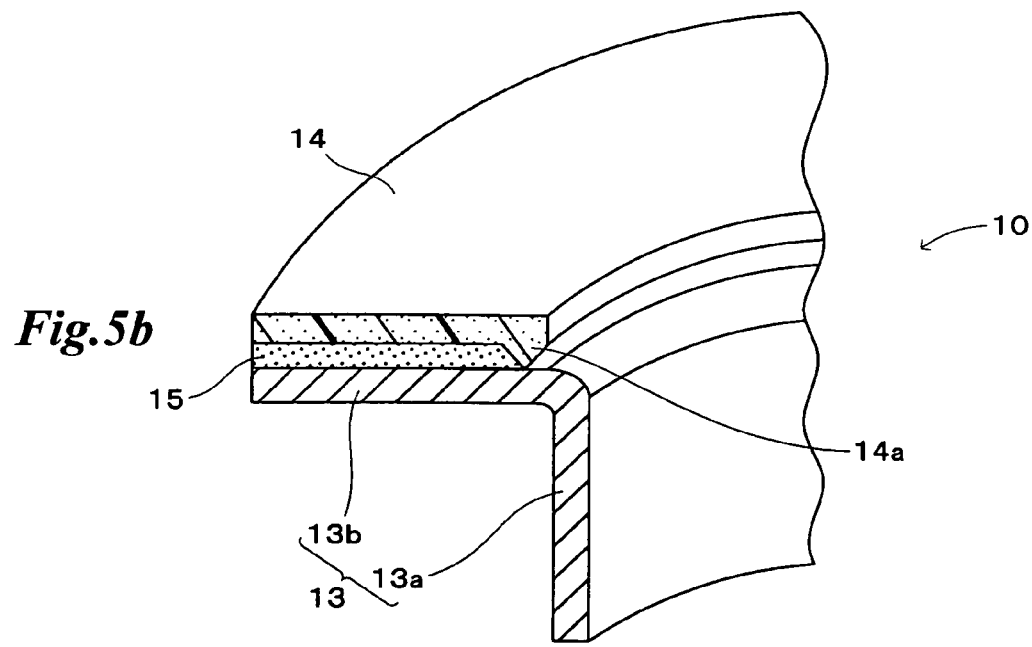

According to the magnetic encoder 10 in FIG. 5b, the projecting portion 14a is formed like a wall along the inner circumferential direction of the circular multipolar magnet 14 and the sectional shape of the tip of the projecting portion 14a is tapered. Thus, the projecting portion 14a may not be limited to be provided along the outer circumferential direction, but may be provided along the inner circumferential direction.

Figure 6:
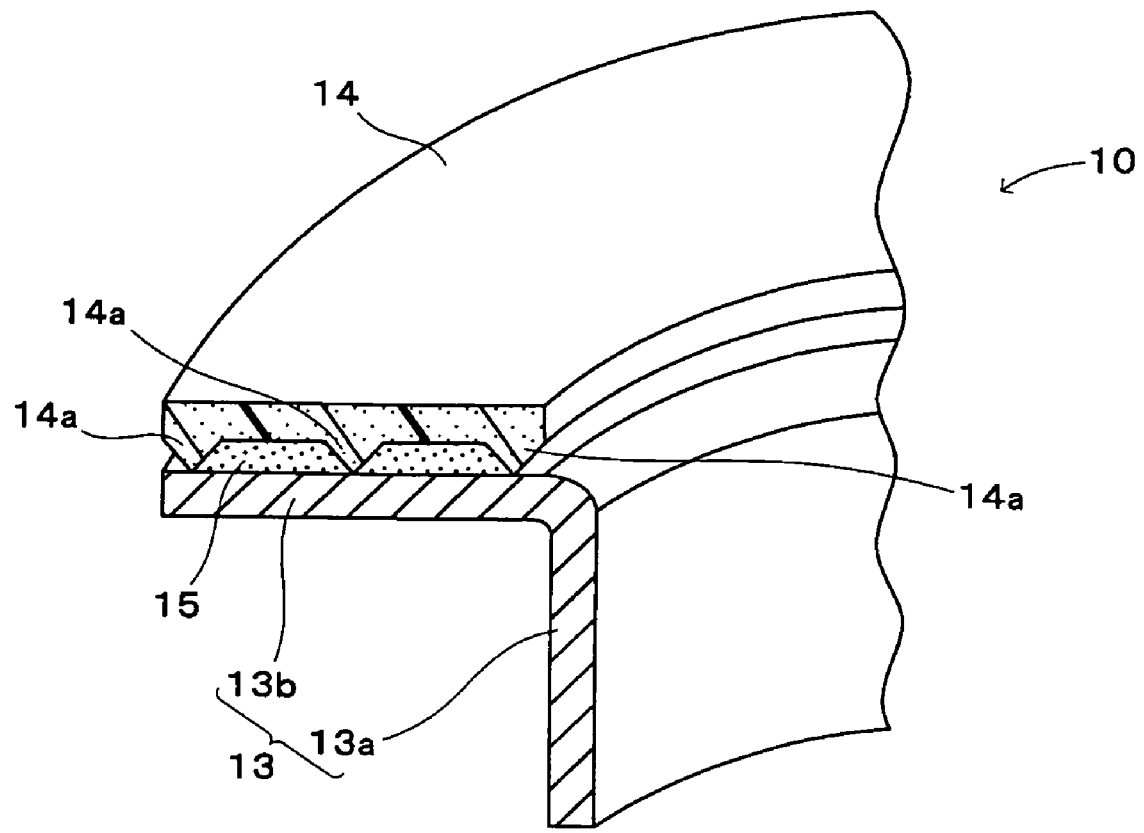
FIG. 6 is a perspective sectional view of a modified example of the magnetic encoder.

According to the magnetic encoder 10 in FIG. 6, the projecting portion 14a is formed at the center along the circumferential direction other than the inner circumferential direction and the outer circumferential direction and the sections of the tip thereof are tapered.

Figure 4B:
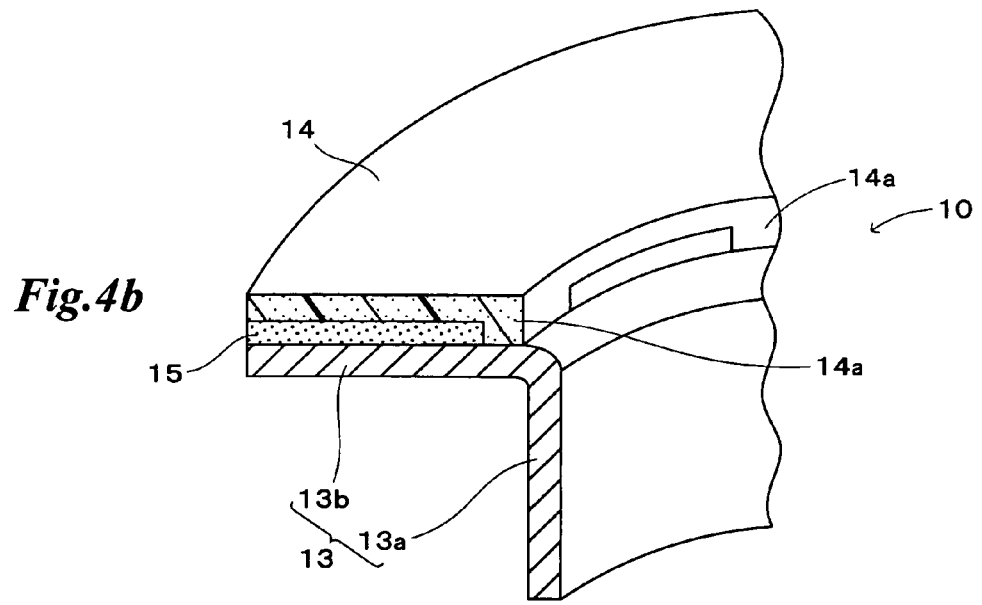

It goes without saying that the projecting portion 14a in FIG. 5a, FIG. 5b and FIG. 6 may be partially provided (not shown) like FIG. 4b.

Figure 7A:
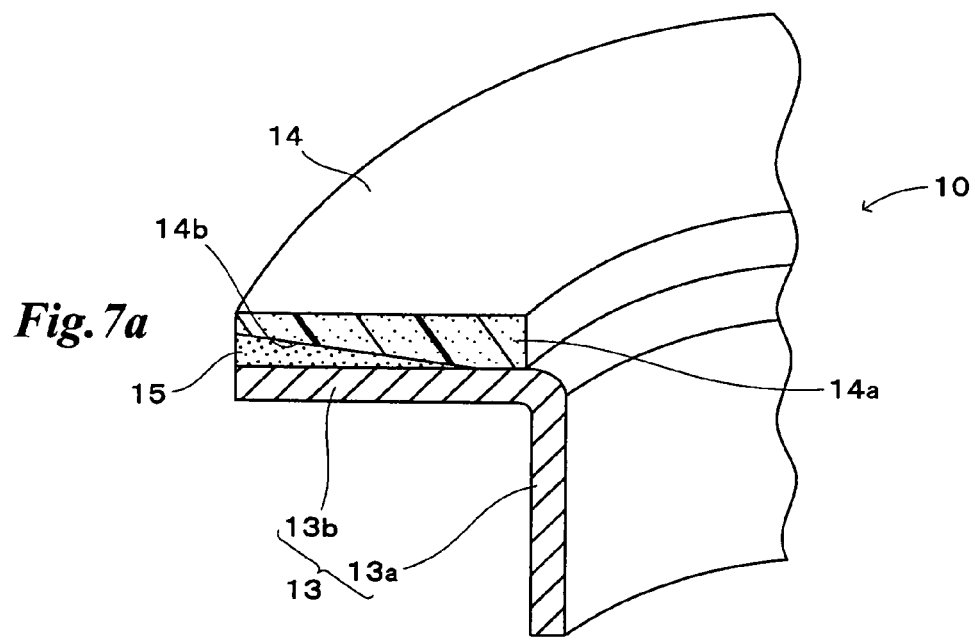
FIG. 7a and FIG. 7b are perspective sectional views of a modified example of the magnetic encoder.

According to the magnetic encoder 10 in FIG. 7a, the projecting portion 14a is formed on the whole circumference along the inner circumferential direction and the adhesion face 14b is formed so as to be slant (tapered) into the projecting portion 14a.

Figure 7B:
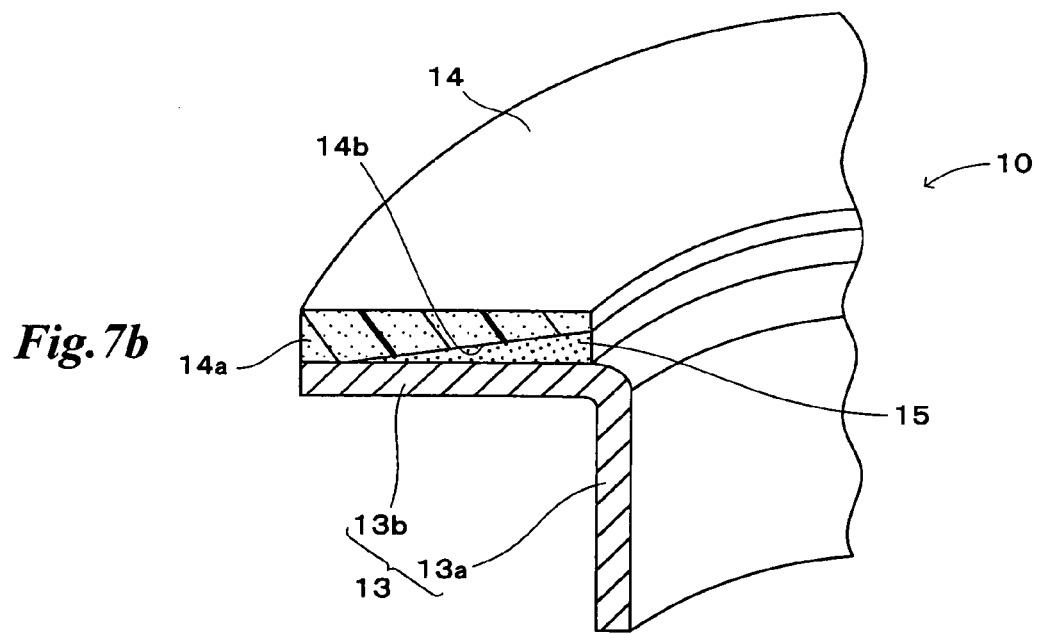

According to the magnetic encoder 10 in FIG. 7b, the projecting portion 14a is formed on the whole circumference along the outer circumferential direction and the adhesion face 14b is formed so as to be slant (tapered) into the projecting portion 14a.

In either example in FIG. 7a and FIG. 7b, the adhesion surface area of the adhesion face 14b can be wide, thereby enabling to stably and firmly bond the metal reinforcing ring 13 and the circular multipolar magnet 14.

It goes without saying that the projecting portion 14a in FIG. 7a and FIG. 7b may be partially provided (not shown) like FIG. 4b.

Figure 8:
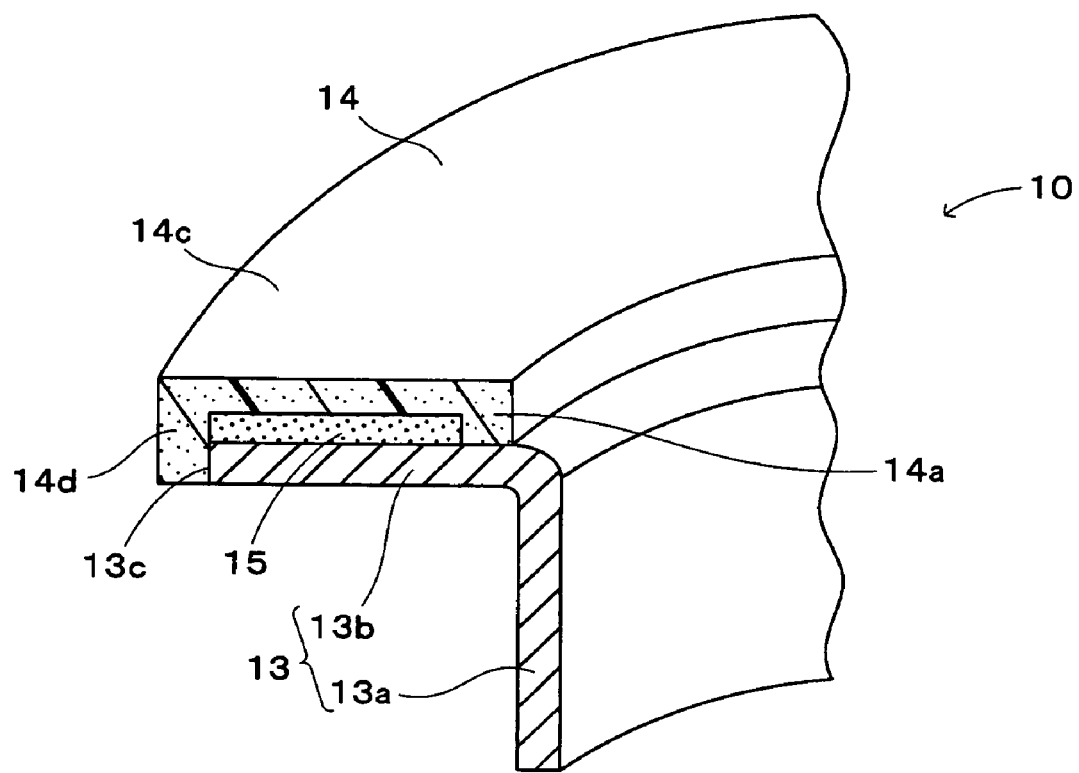
FIG. 8 is a perspective sectional view of a modified example of the magnetic encoder.

According to the magnetic encoder 10 in FIG. 8, the projecting portion 14a is formed along the inner circumferential direction of the circular multipolar magnet 14 and there provided an engaging section 14d which contacts with an external peripheral face 13c of the outward brim portion 13b. Therefore, the metal reinforcing ring 13 and the circular multipolar magnet 14 are stably and firmly bonded by means of the engaging section 14d. The engaging section 14d is formed so as to go around the external peripheral face 13c of the outward brim portion 13b, so that the magnetizing face 14c of the circular multipolar magnet 14 can be enlarged, thereby improving the accuracy of rotation detection.

It goes without saying that the projecting portion 14a in FIG. 8 may be also partially provided (not shown) like FIG. 4b.

Figure 9:
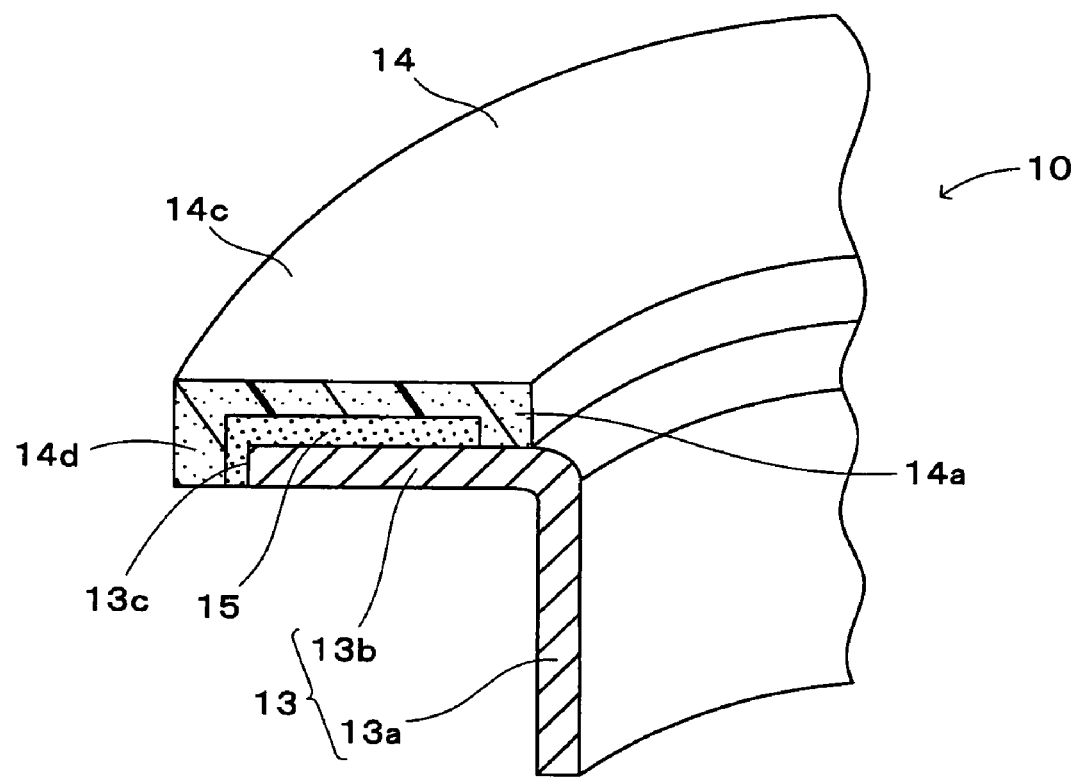
FIG. 9 is a perspective sectional view of a modified example of the magnetic encoder.

According to the magnetic encoder 10 in FIG. 9, like the example in FIG. 8, the projecting portion 14a is formed along the inner circumferential direction of the circular multipolar magnet 14 and there provided the engaging section 14d which contacts with the external peripheral face 13c of the outward brim portion 13b. This example is different from that in FIG. 8 in that the adhesive layer 15 is formed into the external peripheral face 13c of the outward brim portion 13b. According to this example, the adhesive layer 15 is formed so as to go around the external peripheral face 13c, so that the adhesion surface area of the layer thickness "r" can be broaden, thereby more stably and firmly bonding the metal reinforcing ring 13 and the circular multipolar magnet 14.

It goes without saying that the projecting portion 14a in FIG. 9 may be partially provided (not shown) like FIG. 4b.

Figure 10A:
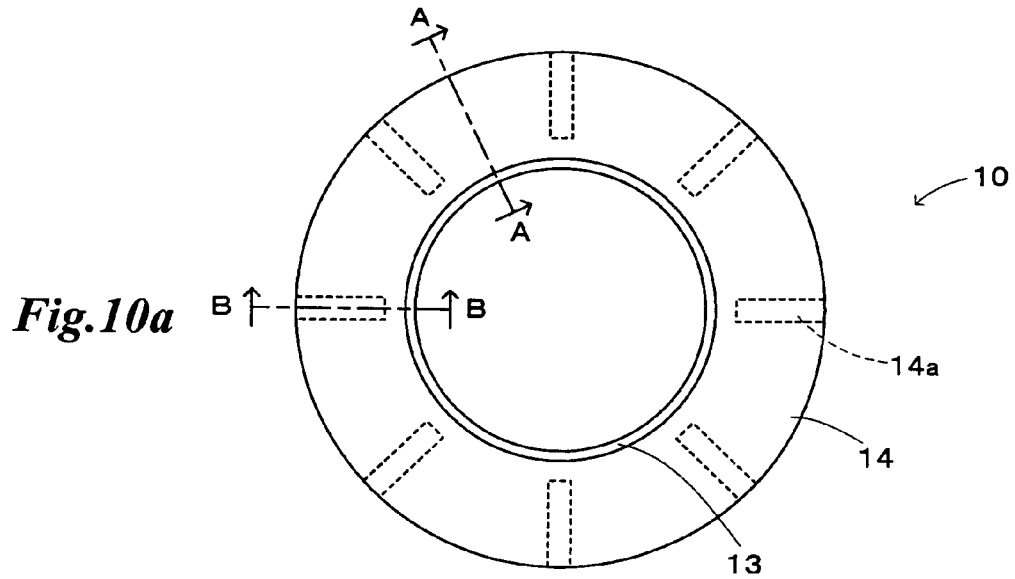
FIG. 10a is a plane view of a magnetic encoder according to other embodiment.
Figure 10B:
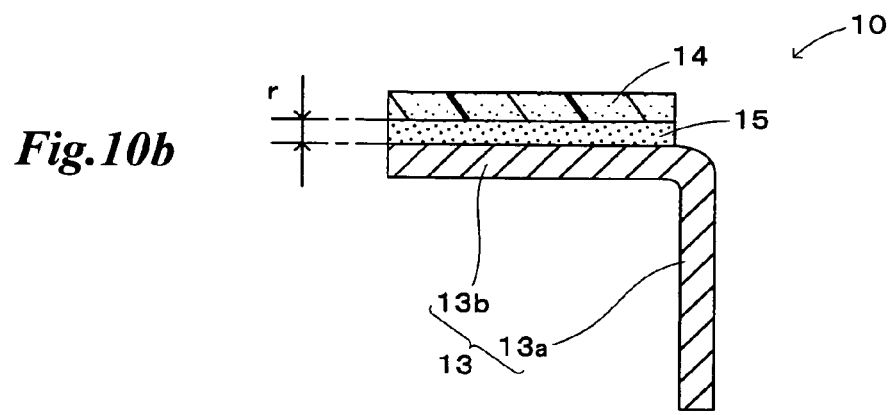
Figure 10C:
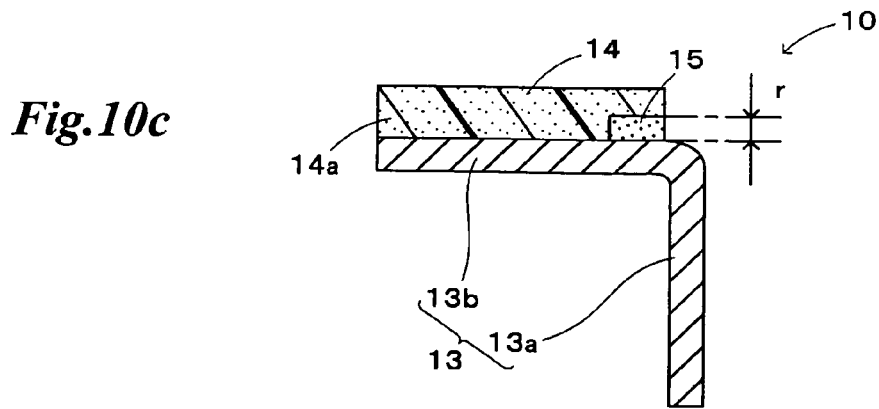

Next the second embodiment of the present invention is explained referring to FIG. 10a, FIG. 10b and FIG. 10c. The common members with the first embodiment are allotted with the same reference numerals and their explanation is omitted.

According to the magnetic encoder 10 in FIG. 10a to FIG. 10c, the projecting portion 14a is formed in the radial direction from the center of the circular multipolar magnet 14.

The projecting portion 14a is formed so as to obtain the layer thickness "r" as shown in FIG. 10c, so that the layer thickness "r" can be kept as shown in FIG. 10b, thereby achieving the same effects as those of the first embodiment.

The sectional shape of the tip of the projecting portion 14a can be tapered also in the preferred embodiment 2, so that the area of the projecting portion 14a contacting with the metal reinforcing ring 13 can be made smaller, thereby obtaining a wide adhesion surface area of the layer thickness "r".

Figure 11A:
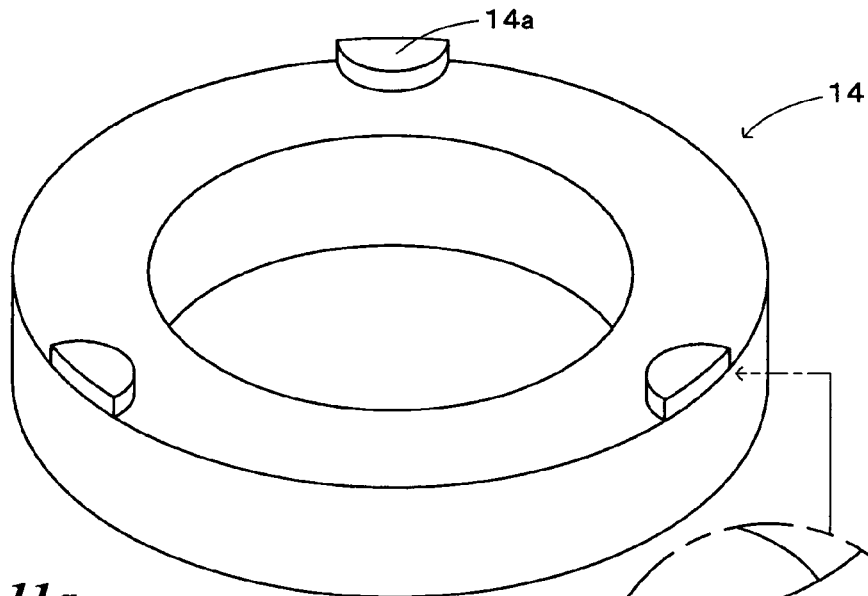
FIG. 11a is a perspective view showing a circular multipolar magnet constituting a magnetic encoder according to a still further embodiment.
Figure 11B:
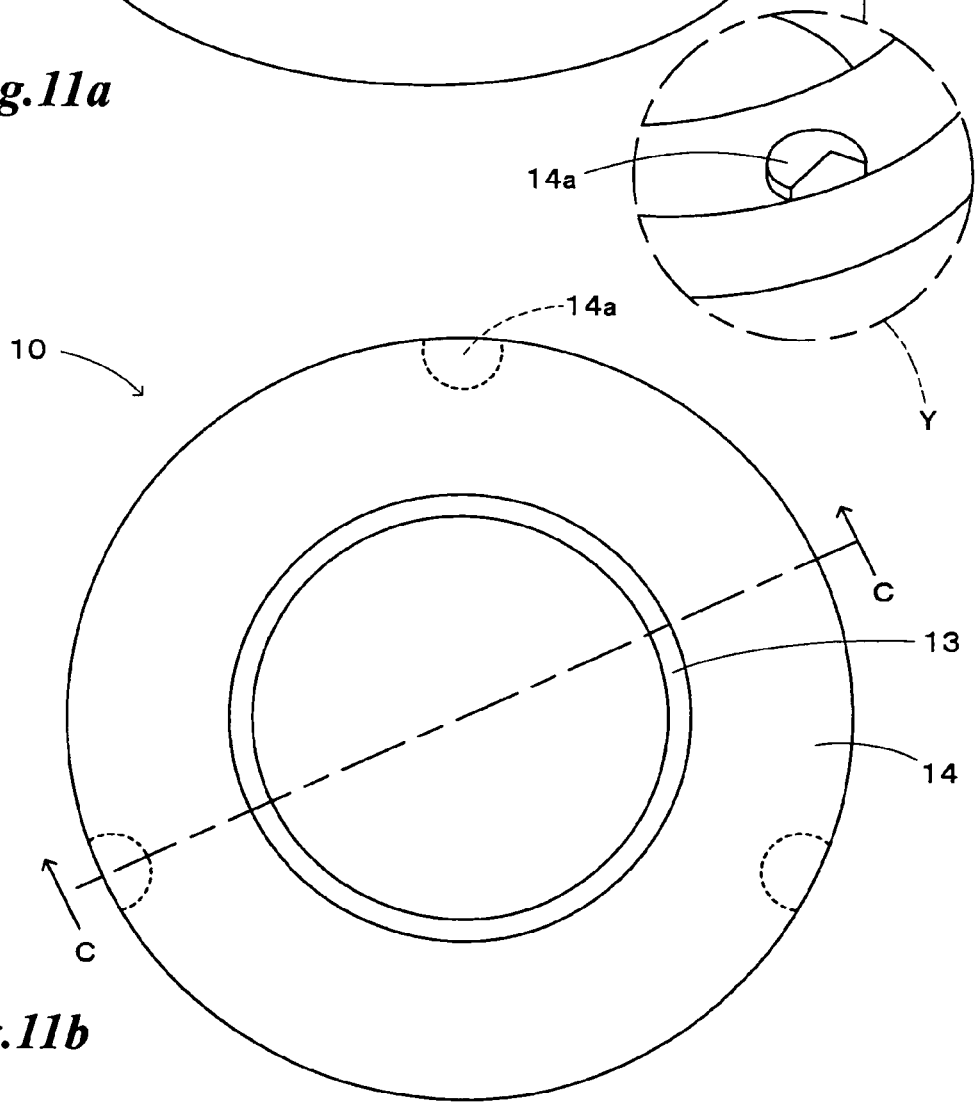
FIG. 11b shows the plane view of the magnetic encoder.
Figure 12:
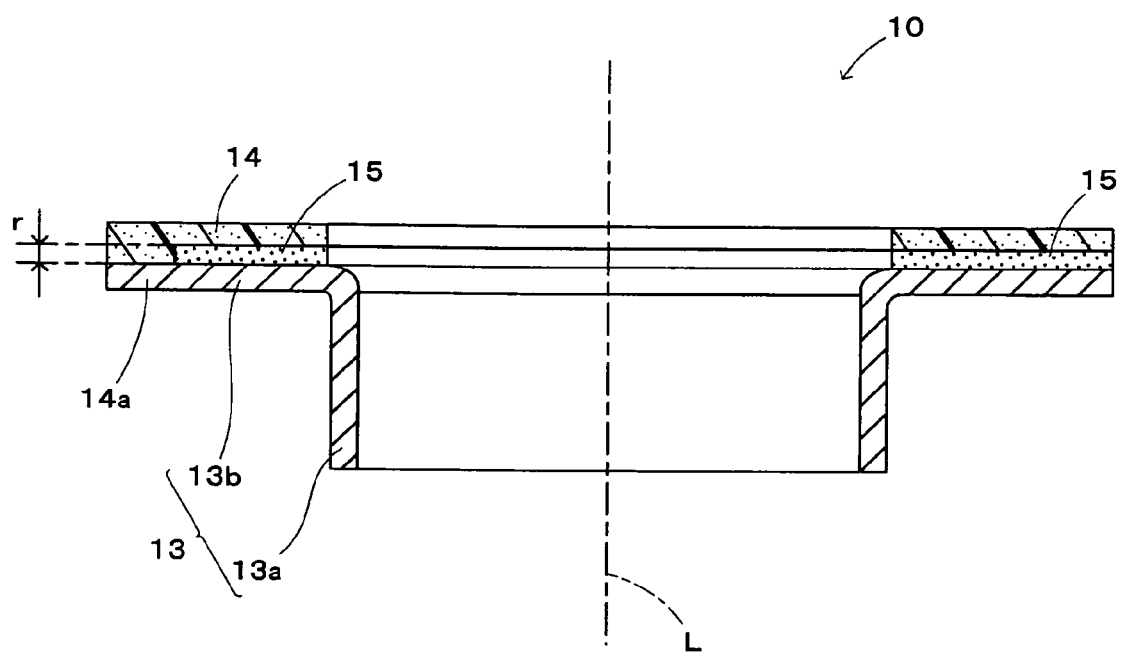
FIG. 12 is a fragmental sectional view along the line C-C in FIG. 11b.
Figure 14:
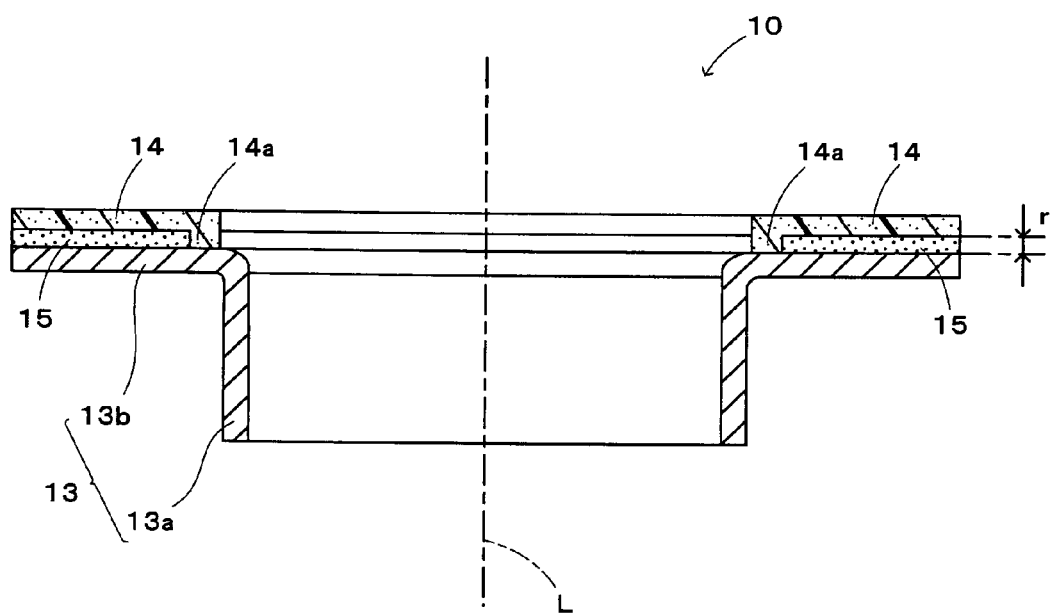
FIG. 14 is a fragmental sectional view along the line D-D in FIG. 13b.

Next the third embodiment of the present invention is explained referring to FIG. 11a, FIG. 11b through FIG. 14. The common members with the first embodiment are allotted with the same reference numerals and their explanation is omitted. The reference "L" in FIG. 12 and FIG. 14 shows a center line.

The magnetic encoders 10 in FIG. 11a, FIG. 11b and FIG. 12 are same in that three semicircular projecting portions 14a are separately provided at the outer periphery of the circular multipolar magnet 14. However, the shape and the number of the projecting portion 14a are not limited, and they may be at the inner periphery of the circular multipolar magnet 14 (not shown).

As shown in the enlarged view Y with dotted line in FIG. 11a, the sectional shape of the tip of the projecting portion 14a may be tapered. In such a case, the area of the projecting portion 14a contacting with the metal reinforcing ring 13 is smaller, thereby obtaining a wide adhesion surface area of the layer thickness "r".

The projecting portion 14a is formed so as to obtain the layer thickness "r" as shown in FIG. 12, thereby keeping a fixed thickness layer "r".

The same effects as the first embodiment can be achieved in this third embodiment and the metal reinforcing ring 13 and the circular multipolar magnet 14 are bonded like the procedures shown in FIG. 4.

Next the modified example of the third embodiment of the present invention is explained referring to FIG. 13a, FIG. 13b and FIG. 14. The common members with the first embodiment are allotted with the same reference numerals and their explanation is omitted.

The magnetic encoders 10 in FIG. 13a, FIG. 13b and FIG. 14 are same in that four projecting portions 14a are separately provided at the outer periphery side and at the inner periphery side of the circular multipolar magnet 14. However, the shape and the number of the projecting portion 14a are not limited.

As shown in the enlarged view Z with dotted line in FIG. 13a, the sectional shape of the tip of the projecting portion 14a may be tapered. In such a case, the area of the projecting portion 14a contacting with the metal reinforcing ring 13 is smaller, thereby obtaining a wide adhesion surface area of the layer thickness "r".

The projecting portion 14a is formed so as to obtain the layer thickness "r" as shown in FIG. 14, thereby keeping a fixed thickness layer "r".

The same effect as the first embodiment can be achieved in this modified example.

Figure 15:
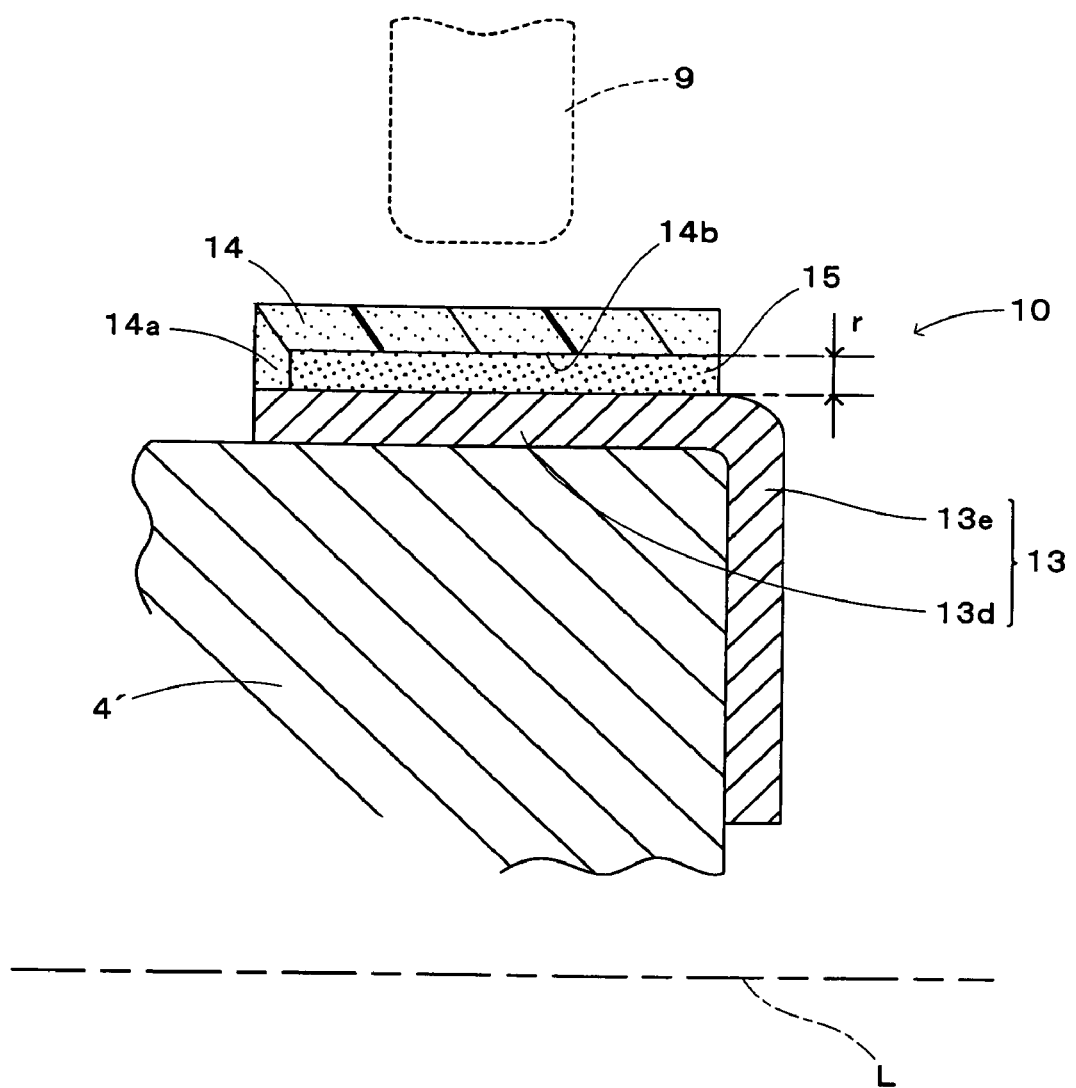
FIG. 15 is a sectional view of a magnetic encoder according to still further embodiment.

Next, the fourth embodiment of the present invention is explained referring to FIG. 15.

The magnetic encoder 10 in the first to the third embodiments of the present invention constitutes an axial encode, however, the magnetic encoder in this embodiment is different from them and constitutes a radial encoder.

The metal reinforcing ring 13 comprises a cylindrical portion 13d to be fitted and fixed in the outer peripheral face of a rotary side member 4' and an inward brim portion 13e integrally connected with one end of the cylindrical portion 13d. The circular multipolar magnet 14 is formed cylindrical capable of externally fitted in the cylindrical portion 13d of the metal reinforcing ring 13 and the magnetic encoder 10 is formed in such a manner that the metal reinforcing ring 13 and the circular multipolar magnet 14 are fixed and integrated by externally fitting the circular multipolar magnet 14 in the cylindrical portion 13d via the adhesive layer 15. The magnetic encoder 10 detects the rotation together with the magnetic sensor 9 which is closely faced in the radial direction.

According to the magnetic encoder 10 in FIG. 15, the projecting portion 14a is formed like a wall inwardly along the circumferential direction of the circular multipolar magnet 14 so as to have the layer thickness "r" of the adhesive layer.

This embodiment has the same effects as the first embodiment.

The projecting portion 14a in this embodiment is not limited to be provided inwardly along the circumferential direction of the circular multipolar magnet 14. It goes without saying that the axial encoder described in the first embodiment and its modified examples (FIG. 2-FIG. 9), in the second embodiment and its modified examples (FIG. 10-FIG. 12), and in the third embodiment and its modified examples (FIG. 13a, FIG. 13b and FIG. 14) may be applied to the radial encoder.

For example, the projecting portion 14a may be partially provided (FIG. 4b) or the sectional area of the tip of the projecting portion 14a may be tapered (FIG. 5a, FIG. 5b, FIG. 6, enlarged view Y in FIG. 11a, enlarged view Z in FIG. 13a). Or a plurality of the projecting portions 14a along the axial direction may be provided with space along the circumferential direction (FIG. 11a, FIG. 13a), the adhesion face 14b may be tapered (FIG. 7a, FIG. 7b), or the engaging section may be formed so as to go around the edge of the cylindrical portion 13d of the metal reinforcing ring 13 (FIG. 8, FIG. 9).

It goes without saying that the shape of the projecting portion 14a is not limited to the shape shown in the figures, the application example of the magnetic encoder is not limited to the above-mentioned embodiments, the magnetic encoder can be applied to a rotary side member such as a bearing, a bearing unit or a rotary shaft (driving shaft) at a rotating part which requires to detect the rotation as long as the tone wheel is attached to a rotary side member and constitutes a magnetic encoder together with a magnetic sensor provided for a stationary side member. Further, although the circular multipolar magnet 14 is practically magnetized after being integrated with the metal reinforcing ring 13, it may be magnetized before being integrated.

The invention claimed is:

1. A magnetic encoder constituting rotation detector in combination with a magnetic sensor fixed onto a stationary side member, said magnetic encoder comprising a metal reinforcing ring fitted into a rotary side member and a circular multipolar magnet fixed to said metal reinforcing ring with an adhesive, in which said circular multipolar magnet has a projecting portion on its surface projecting toward said metal reinforcing ring and a slant surface with a terminal end constituted by said projecting portion and a gap for an adhesive layer is formed between said slant surface and said metal reinforcing ring, wherein:
   said projecting portion is formed along the whole inner circumference of said circular multipolar magnet,
   said slant surface is formed so slant that the thickness of said circular multipolar magnet is gradually smaller from an inner circumferential side of said circular multipolar magnet to an outer circumferential side thereof, and
   said adhesive layer is formed such that it is gradually thinner from said outer circumferential side of said circular multipolar magnet to said inner circumferential side thereof.

2. The magnetic encoder as set forth in claim 1, wherein the thickness of said adhesive layer is from 20 μm to 300 μm in at least one part.

3. A magnetic encoder constituting rotation detector in combination with a magnetic sensor fixed onto a stationary side member, said magnetic encoder comprising a metal reinforcing ring fitted into a rotary side member and a circular multipolar magnet fixed to said metal reinforcing ring with an adhesive, in which said circular multipolar magnet has a projecting portion on its surface projecting toward said metal reinforcing ring and a slant surface with an terminal end constituted by said projecting portion, and a gap for an adhesive layer is formed between said slant surface and said metal reinforcing ring, wherein
   said projecting portion is formed along the whole outer circumference of said circular multipolar magnet,
   said slant surface is formed so slant that the thickness of said circular multipolar magnet is gradually smaller from an outer circumferential side of said circular multipolar magnet to an inner circumferential side thereof, and said adhesive layer is formed such that it is gradually thinner from said inner circumferential side of said circular multipolar magnet to said outer circumferential side thereof.

4. The magnetic encoder as set forth in claim 3, wherein the thickness of said adhesive layer is from 20 μm to 300 μm in at least one part.

* * * * *